Figure 1:
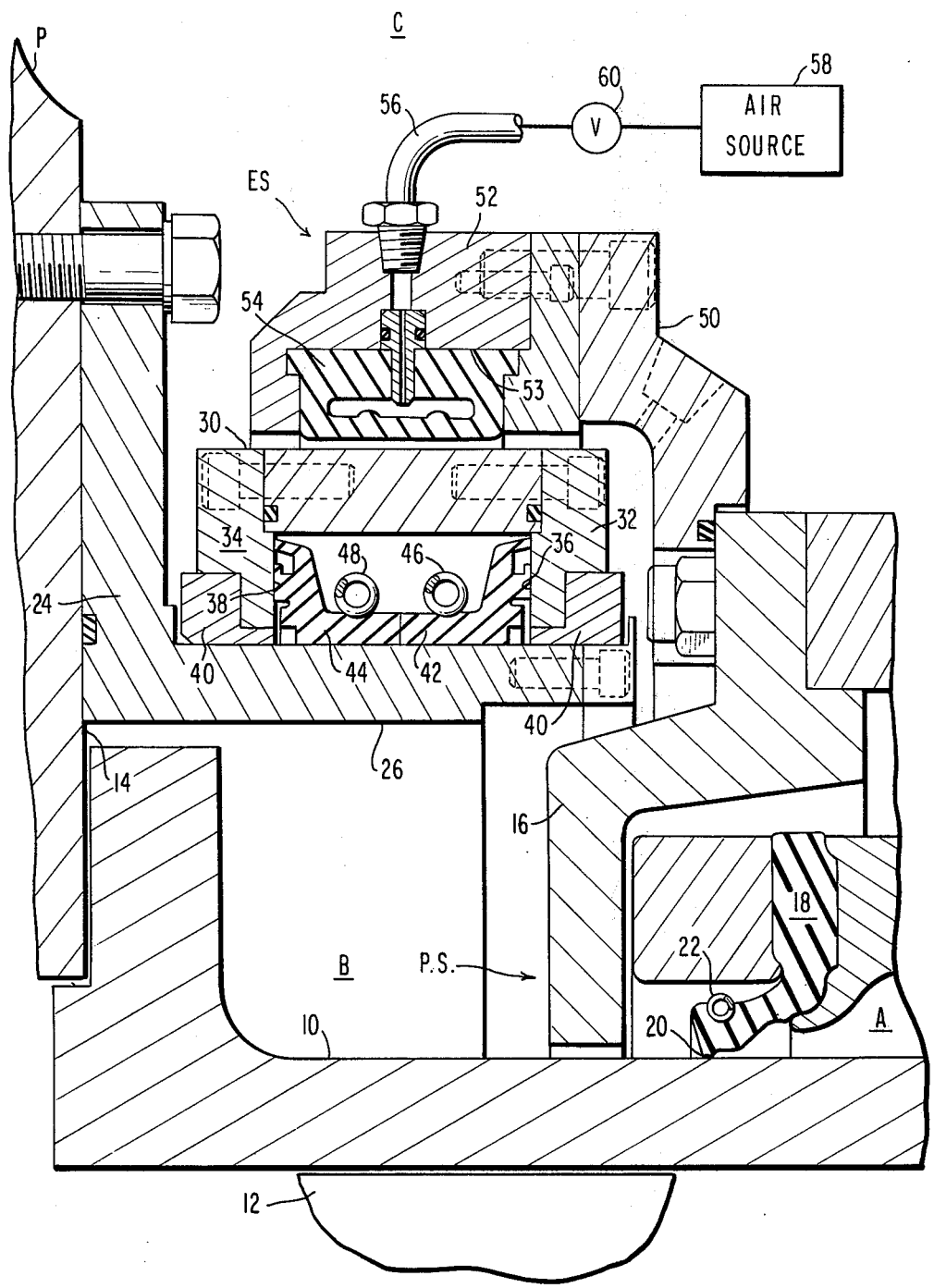

United States Patent [19]
Catanzaro

[11] 3,985,365
[45] Oct. 12, 1976

[54] REMOTELY ACTUATED EMERGENCY SHAFT SEAL

[76] Inventor: Bartholomew Thomas Catanzaro, 288 Potters Ave., Warwick, R.I. 02886

[22] Filed: Nov. 6, 1975

[21] Appl. No.: 629,220

[52] U.S. Cl. .................................. 277/9; 277/34
[51] Int. Cl.² .......................................... F16J 9/00
[58] Field of Search .................. 277/9, 1, 34, 34.3

[56] References Cited
UNITED STATES PATENTS

| | | | |
|---|---|---|---|
| 3,161,229 | 12/1964 | Sanders | 277/34 |
| 3,178,779 | 4/1965 | Clark et al. | 277/34 |
| 3,330,563 | 7/1967 | De Puydt et al. | 277/34 |
| 3,337,222 | 8/1972 | Smith | 277/34 |
| 3,525,529 | 8/1970 | Pfeifer et al. | 277/1 |
| 3,563,555 | 2/1971 | Koons | 277/9 |
| 3,689,082 | 9/1972 | Satterthwaithe | 277/34 |
| 3,697,088 | 10/1972 | Hummer | 277/9 |
| 3,810,635 | 5/1974 | Richter | 277/34 |

*Primary Examiner*—Robert I. Smith
*Attorney, Agent, or Firm*—Finnegan, Henderson, Farabow & Garrett

[57] ABSTRACT

Disclosed is an emergency shaft seal for remote actuation in the event the primary shaft seal fails. The emergency shaft seal includes a seal housing rotatably mounted on an element rotatable with the shaft. At least one end face seal is carried by and rotates with the element. The end face seal engages a sealing surface on a gland plate carried by the seal housing whereby the housing is frictionally engaged and normally rotates with the element and shaft. An inflatable bladder is carried by a housing fixed to structure supporting the shaft and element for rotation and encircles the seal housing. The seal housing, rotatable element, and bladder housing define an area on the side of the primary seal remote from the shaft bearing lubricants and which area normally lies in open communication with the surrounding environment through the annular space between the bladder and seal housing. When the primary seal fails and shaft bearing lubricants leak into this area, the bladder is inflated and expands radially inwardly to engage the seal housing and prevent its rotation relative to the end face seal. The bladder and seal housing form a static seal while the rotating end face seal and stationary gland plate surface form a dynamic seal whereby the area, into which the shaft bearing lubricants leak upon failure of the primary seal, is sealed from the surrounding environment.

19 Claims, 2 Drawing Figures

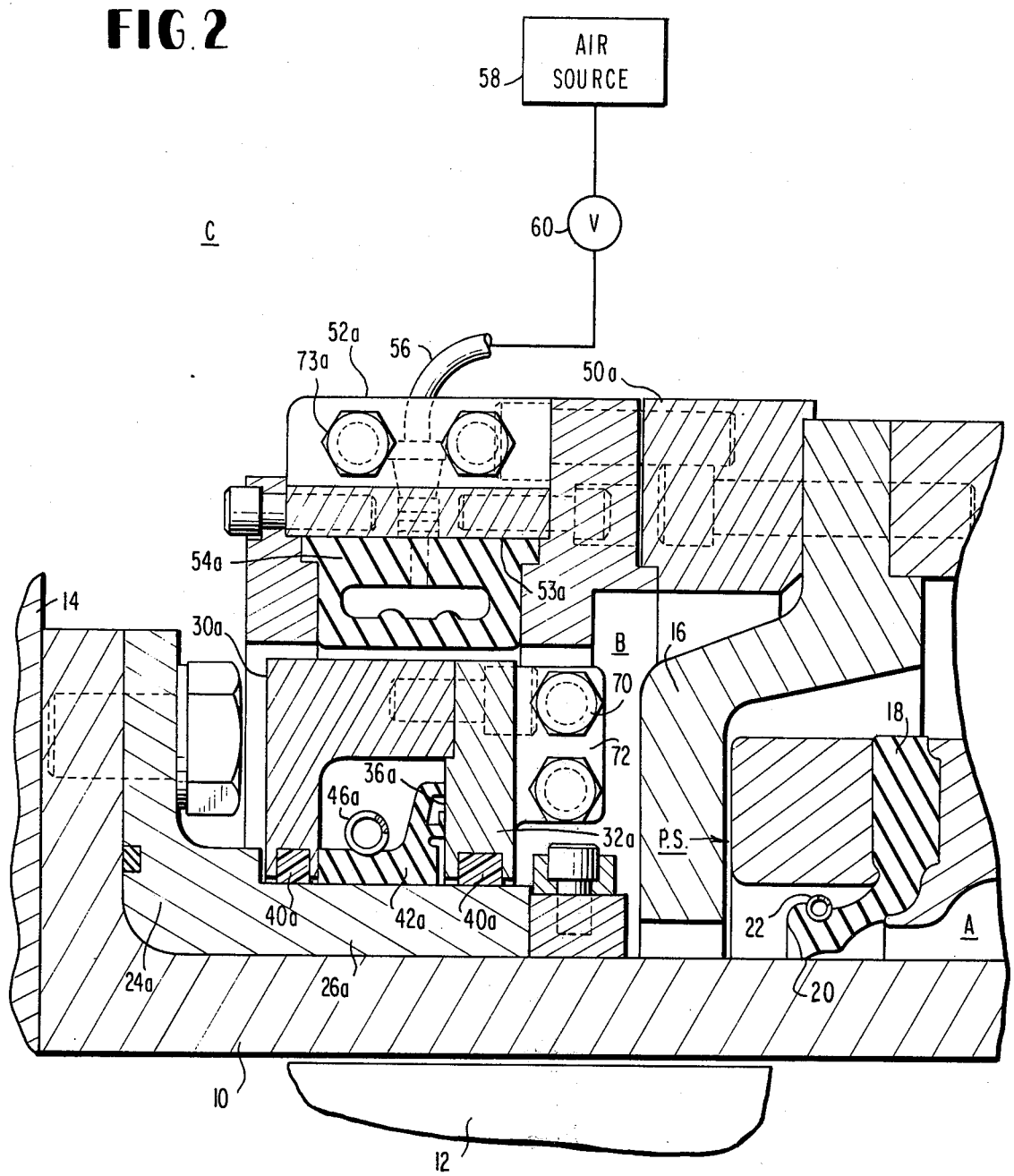

REMOTELY ACTUATED EMERGENCY SHAFT SEAL

The present invention relates to a remotely actuated shaft seal and particularly relates to an emergency shaft seal which is remotely actuated in the event the primary seal fails to prevent leakage of shaft bearing lubricants to the surrounding environment.

Emergency shaft seals for use in preventing leakage of lubricating fluids between the rotating shaft and a fixed housing or structure in the event of failure of a primary seal between the shaft and fixed housing have been proposed and constructed in the past. For example, various previously proposed and presently manufactured emergency seals employ an inflatable bladder which encompasses the rotating shaft or an element carried by the shaft. In the event of failure of the primary seal, the bladder is inflated to expand against the rotating shaft or element thereby creating a dynamic seal between the fixed bladder and the rotating shaft or element. The bladder can be used only over a very short period of time since it is subject to constant wear along its inside diameter and premature failure. This type of seal is also not particularly effective since it must seal against a shaft or element which may have been previously coated with abrasive materials. Since the bladder is normally deflated and spaced from the shaft or rotatable element, ample opportunity is afforded for abrasive material to accumulate about the shaft surface against which the bladder will bear when inflated. Thus, prior rigid inflated bladders used in seals of this type frequently bear against a rotating abrasive surface which may puncture or tear the bladder and substantially reduce its effectiveness and longevity.

The present invention provides an emergency remotely actuated shaft seal which minimizes or eliminates the foregoing and other problems associated with prior emergency shaft seals and provides a novel and improved remotely actuated emergency seal having various advantages in construction, operation and result in comparison with such prior emergency seals. The present remotely actuated emergency shaft seal is particularly useful as a short term propeller shaft seal which enables large ocean-going vessels to continue operations for a limited time after partial or complete failure of the vessel's main or primary tail shaft seal and without polluting its surrounding environment. The following description is therefore presented in terms of an emergency shaft seal useful on the main propeller shaft of a vessel. It will be appreciated, however, that the present emergency seal has other and more general application, i.e. shipboard bulkhead seals or other large shaft seals requiring a remotely actuated emergency seal, and is not limited to use on the propeller shafts of vessels.

Particularly, the present invention provides a remotely actuated emergency shaft seal for use in the event the primary shaft seal fails including an annular seal housing carried by and about a seal sleeve rotatable with the propeller shaft. The seal housing is mounted on bearings on the seal sleeve whereby relative rotation between the seal housing and seal sleeve can be obtained for reasons noted hereinafter. The seal housing is channel-shaped in cross section and, in one form of the present invention, its opposed flanges comprise gland plates having opposed internal sealing surfaces at axially opposite ends of the seal housing. A pair of end face seals are carried by and are rotatable with the seal sleeve. The end face seals respectively engage the sealing surfaces of the gland plates. Prior to actuation of the emergency seal, the seal housing, end face seals, and seal sleeve rotate with the propeller shaft, the frictional engagement between the end face seals and the gland plates rotating the seal housing with the seal sleeve.

An inflatable bladder is carried by a fixed housing about the propeller shaft and encircles the seal housing. The bladder is normally deflated and, when deflated, is spaced radially outwardly of the seal housing. The casing also carries part of the primary seal about the propeller shaft. The seal housing, bladder housing, seal element and bladder define an area on the side of the primary seal remote from the shaft bearing lubricants and which area normally lies in open communication with the surrounding environment through the annular space between the bladder and the seal housing.

In the event of failure of the primary seal, the vessel operator causes air to be supplied to the inflatable bladder. The bladder then inflates and expands radially inwardly to engage the seal housing which rotates with the seal sleeve. When engaged, the bladder brakes the seal housing and prevents it from rotating further. The bladder also forms a static seal with the seal housing between the seal sleeve and the primary seal housing. The end face seals which continue to rotate with the seal sleeve seal against the opposed now stationary sealing surfaces of the gland end plates within the seal housing and form a dynamic seal. The dynamic seal prevents shaft bearing oil leakage through the bearings between the seal housing and the seal sleeve. Thus, the static and dynamic seals prevent oil leakage from the area between the shaft housing and propeller hub and confined by the seal sleeve, bladder, seal housing and bladder housing.

In another form of the present invention, a single end face seal is carried by the seal sleeve. The operation of the emergency seal is similar to the emergency seal operation previously described with the exception that only one end face dynamic seal is provided. In this form, however, the components of the emergency seal are reduced in diameter enabling assembly directly over the propeller shaft's main seal sleeve component. Split housing components are also utilized enabling ready disassembly and assembly of the emergency seal without removal of the ship's propeller or related hardware.

Accordingly, it is a primary object of the present invention to provide a novel and improved remotely actuated emergency shaft seal for use in the event of failure of the primary shaft seal.

It is another object of the present invention to provide a remotely actuated emergency shaft seal having its dynamic sealing surfaces in contact each with the other at all times whereby foreign substances are prevented from building up between the rotating and stationary seal elements.

It is still another object of the present invention to provide a remotely actuated emergency shaft seal for use in the event of failure of the primary shaft seal wherein an inflatable bladder is utilized to form both a static seal and actuate a dynamic seal without substantial wearing action on the bladder.

It is a further object of the present invention to provide a novel and improved remotely actuated emergency shaft seal for use in the event of a failure of the primary shaft seal wherein wear on the primary rotating shaft and seal sleeve is entirely eliminated.

It is a still further object of the present invention to provide a novel and improved remotely actuated emergency shaft seal particularly useful for ocean-going vessels for preventing pollution from partial or complete failure of the primary propulsion shaft seal.

These and further objects and advantages of the present invention will become more apparent upon reference to the following specification, appended claims and drawings wherein:

FIG. 1 is a fragmentary cross-sectional view of a remotely actuated emergency shaft seal constructed in accordance with the present invention and illustrating its arrangement in conjunction with a primary shaft seal; and FIG. 2 is a view similar to FIG. 1 illustrating a further embodiment of the present invention.

Referring now to the drawings, particularly to FIG. 1, there is illustrated a stern tube sleeve seal 10 which surrounds and rotates with a shaft 12. The shaft 12 may, for example, constitute the main propulsion shaft of a vessel, not shown, and to which is attached a propeller P, the hub of which is designated 14. Also illustrated is a stern tube aft seal including a casing 16 fixed to the vessel's hull structure, also not shown, and surrounding shaft 12 and stern tube seal sleeve 10. Within casing 16, there is provided the primary shaft seal generally designated P.S. and which includes a rubber tipped seal 18 having an edge 20 which bears on and about the stern tube seal sleeve 10 under the bias of a garter type spring 22. The construction of the primary shaft seal P.S. is well known and further details thereof are not believed necessary to an understanding of the present invention. It is believed sufficient to note that the primary shaft seal P.S. prevents oil leakage from the area designated A into the area designated B.

As illustrated, a seal sleeve 26 having a flange 24 is suitably secured by bolts through the flange to the forward face of propeller hub 14 and surrounds stern tube seal sleeve 10. A remotely actuated emergency shaft seal generally designated E.S. is disposed between propeller hub 14 and stern tube casing 16. Emergency seal E.S. serves to prevent leakage of lubricating oil from the area B externally to the area designated C in the event of failure of the primary seal P.S. and shaft bearing oil leakage from area A to area B. To accomplish this, emergency seal E.S. includes an annular seal housing 30 which surrounds seal sleeve 26. Seal housing 30 is channel shaped in cross section as illustrated and opposed annular end plates 32 and 34 of housing 30 form glands having opposed internal sealing surfaces 36 and 38 respectively. Bearings 40 are provided along the inner edges of end plates 32 and 34 whereby seal housing 30 is rotatable relative to sleeve 26. Bearings 40 may comprise standard phenolic bearings.

Within seal housing 30 and disposed about sleeve 26 are a pair of back-to-back end face seals 42 and 44. The end face seals 42 and 44 have radially outwardly directed flanges, the axially facing end faces of which bear against the corresponding sealing surfaces 36 and 38 respectively. The end face seals are formed of a resilient material, for example rubber, and are frictionally retained on sleeve 26 for rotation therewith by respective garter type springs 46 and 48. The end face seals 42 and 44 are preloaded and in continuous contact with the respective sealing surfaces of the gland plates 32 and 34. Such frictional engagement causes seal housing 30 to normally rotate with end face seals 42 and 44, seal sleeve 26 and the propeller when the shaft 12 and stern tube seal sleeve 10 rotate.

An annular support 50 is suitably secured to stern tube casing 16 and projects in an aft direction to support an annular housing 52 radially outwardly of and in concentric relation to seal housing 30. Carried along a suitable recess 53 formed in the inner face of housing 52 is an inflatable bladder 54. Bladder 54 surrounds seal housing 30 and, when deflated, its inside surface is spaced radially outwardly of and out of contact with seal housing 30. Bladder 54 is connected by a conduit 56 to an air source 58. A valve 60 is disposed in conduit 56 whereby air can be supplied from source 58 through conduit 56 to inflate bladder 54.

From the foregoing description and review of FIG. 1, it will be appreciated that the primary seal P.S. prevents leakage of oil from the area designated A into the area designated B. As long as the primary seal remains effective, the emergency seal remains unactivated. It will also be appreciated that area B is open to the surrounding environment, i.e. the sea in the particular application described, through the space between annular seal housing 30 and deflated bladder 54. Further, as the propeller P rotates, and seal housing 30, end face seals 42 and 44, and seal sleeve 26 rotate with the propeller, the frictional engagement between the end faces of the end face seals 42 and 44 and gland plates 32 and 34 respectively drive seal housing 30 for rotation with seal sleeve 26.

In the event of failure of the primary seal P.S., it will be appreciated that oil or lubricating fluid will leak from area A into the area B and beyond into area C, i.e. the surounding sea. To prevent pollution of the sea by the leaking oil, the emergency seal is activated. Particularly, an operator of the vessel opens valve 60 and air is supplied bladder 54 through conduit 56 from source 58. Inflation of bladder 58 causes it to expand radially inwardly into engagement with seal housing 30. The engagement of bladder 54 against seal housing 30 acts as a brake stopping and preventing further rotation of seal housing 30 with seal sleeve 26. However, the end face seals 42 and 44 and seal sleeve 26 continue to rotate with shaft 12 and propeller P. The rotating end face seals 42 and 44 thus bear in sealing relation against the stationary gland end plates 32 and 34 and form a dynamic seal which prevents leakage of oil from area B through bearings 40 into area C. Also, the engagement of stationary bladder 54 against seal housing 30, which becomes stationary after engagement by bladder 54, provides a static seal preventing leakage of oil from area B between bladder 54 and seal housing 30 into area C.

Referring now to FIG. 2, there is illustrated a further and preferred form of the present invention wherein like parts as in the previous embodiment are designated with like numerals and parts corresponding in function to similar parts in the previous embodiment are designated by like numerals followed by the suffix a. In this form, a seal sleeve 26a is suitably secured about the stern tube seal sleeve 10. The primary seal P.S. and the other vessel structure including the stern tube seal sleeve 10, shaft 12 and propeller hub 14 are similar to the corresponding elements described previously. In this form, a seal housing 30a is circumferentially disposed about the seal sleeve 26a. Annular seal housing 30a is channel shaped in cross section with its forward end comprising a gland plate 32a carrying an end sealing surface 36a. Seal housing 30a is rotatable relative to seal sleeve 26a by means of bearings 40a. Within seal housing 30a, there is provided a resilient end face seal 42a, the forward end seal face of which engages sealing surface 36a. Garter spring 46a frictionally retains end face seal 42a about seal sleeve 26a whereby the end face seal of seal 42a is in continuous engagement with the sealing surface 36a of gland plate 32a. As in the prior embodiment, the frictional engagement between the end face seal and the gland plate causes the seal housing to normally rotate with the seal sleeve 26a. The housing 30a is formed of diametrically split components secured together for example by bolts 70 and flange 72 whereby housing 30a can be readily assembled and disassembled about seal sleeve 26a without removal of the ship's propeller or other elements.

An annular support 50a is secured to the stern tube casing 16 and projects in an aft direction to support an annular housing 52a spaced from and circumferentially surrounding housing 30a. The housing 52a is similarly split along a diameter whereby it can be readily assembled and disassembled without removal of the ship's propeller or other related hardware. The split housing components can be secured together by bolts 73. Housing 52a includes a cavity 53a for retaining an inflatable bladder 54a in concentric radially spaced relation to seal housing 30a. As in the prior embodiment, bladder 54a is inflatable by air supplied through conduit 56 and valve 60 from air pressure source 58.

In the event of failure of the primary seal P.S., it will be appreciated that oil would leak from area A into area B and beyond into area C through the annular space between bladder 54a and seal housing 30a. To prevent this, bladder 54a is inflated and expands radially inwardly to engage seal housing 30a. The engagement of bladder 54a against seal housing 30a brakes seal housing 30a to a stop while the end face seal 42a, seal sleeve 26a and stern tube seal sleeve 10 continue to rotate. As in the prior embodiment, the end face seal bears and seals against the sealing surface 36a of gland 32a to provide a dynamic seal whereby leakage from area B through bearing 40a outwardly into area C is prevented. Also, engagement of stationary bladder 54a against the now stationary seal housing 30a forms a static seal similarly preventing leakage of oil from area B into area C.

In this embodiment, all of the components of the emergency seal have been radially reduced enabling assembly directly over the propeller shaft's main seal sleeve. Also, housing components split along a diameter are utilized. This enables direct assembly and disassembly of the component parts of the emergency seal without removal of the ship's propeller or related hardware. The first embodiment can likewise be formed of components similarly split along a diameter.

Various advantages are obtained by the foregoing described embodiments of the present invention. Particularly, the end face or dynamic type seal(s) always lie in engagement with their opposed dealing surface(s) even when the emergency seal remains unactuated. This prevents excessive marine growth or direct build-up of abrasives on the areas which constitute the rotating and stationary sealing surfaces. Also, the loading on the seal(s) can be set prior to installation thus ensuring an effective seal. Further, the wear on the dynamic seal occurs on the end face seal(s) and on the gland plate(s). These elements are easily replaced without disrupting the primary seal. Still further, the inflatable bladder serves a dual purpose. On the one hand, it forms a static seal while on the other hand it acts as a brake on the rotatable seal housing 30 whereby seal housing 30 becomes stationary and its end plate(s) serve as a stationary part of the dynamic seal. Consequently, there is virtually no wear on the inflatable bladder from contact with moving surface(s). Therefore the bladder can be utilized over a long period of time extending the life of the emergency seal. Still further, there is no wear on the shaft or stern tube seal sleeve which might otherwise cause costly and time consuming repairs of these elements.

The invention may be embodied in other specific forms without departing from the spirit or essential characteristics thereof. The present embodiments are therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for forming a seal between a fixed structure and an element supported for rotation by the fixed structure comprising; a seal housing disposed about and carried by the rotatable element, means mounting said seal housing for rotation relative to the rotatable element, said seal housing carrying an end face sealing surface, an end face seal carried by the rotatable element for rotation therewith, said end face seal lying in engagement with said end face sealing surface whereby said housing and said end face seal normally rotate with the rotatable element, an inflatable bladder carried by the fixed structure about the rotatable element and spaced from said seal housing, and means for inflating said bladder to engage said bladder against said seal housing and prevent rotation thereof with said end face seal and the rotatable element, whereby said bladder and said housing form a static seal between the rotatable element and fixed structure and said end face seal and said sealing surface form a dynamic seal between the fixed structure and the rotatable element.

2. Apparatus according to claim 1 wherein said bladder is annular in shape and spaced radially outwardly of said housing, said bladder being expandable in a radially inward direction to engage said housing.

3. Apparatus according to claim 1 wherein said mounting means includes a bearing between said housing and the rotatable element.

4. Apparatus according to claim 1 wherein said end face seal is formed of a resilient material, a spring engagable about said end face seal for clamping said end face seal in frictional sealing engagement about the rotatable element.

5. Apparatus according to claim 1 wherein said seal housing is annular and generally channel shaped in cross section, said end face sealing surface comprising an inside face of one of the flanges of said annular channel shaped housing, said end face seal lying within said channel shaped housing.

6. Apparatus according to claim 1 wherein said seal housing has a second end face sealing surface in axially spaced opposition to the first mentioned end face sealing surface, a second end face seal carried by the rotatable element for rotation therewith, said second end face seal lying in engagement with said second end face sealing surface, said second end face seal and said second end face sealing surface providing a second dynamic seal between the fixed structure and the rotatable element when said bladder is inflated to engage said housing and prevent it from rotating.

7. Apparatus according to claim 6 wherein said seal housing is annular and generally channel shaped in cross section, said end face sealing surfaces being formed along opposed inside faces of the spaced flanges of said annular channel shaped housing, said end face seals lying within said channel shaped housing.

8. Apparatus according to claim 1 wherein said bladder is annular in shape and spaced radially outwardly of said housing, said bladder being expandable in a radially inward direction to engage said housing, said mounting means including a bearing between said housing and the rotatable element, said seal housing being annular and generally channel shaped in cross section, said end face sealing surfaces being formed along opposed inside faces of the spaced flanges of said annular channel shaped housing, said end face seals lying within said channel shaped housing.

9. Apparatus according to claim 8 wherein said seal housing has a second end face sealing surface comprising the inside face of the other flange of said annular channel shaped housing and in axially spaced opposition to the first mentioned end face sealing surface, a second end face seal carried by the rotatable element for rotation therewith and lying within said channel shaped housing, said second end face seal lying in engagement with said second end face sealing surface, said second end face seal and said second end face sealing surface providing a second dynamic seal between the fixed structure and the rotatable element when said bladder is inflated to engage said housing and prevent it from rotating.

10. Apparatus for forming an emergency shaft seal comprising a fixed structure, an element supported for rotation by said fixed structure, a primary shaft seal between said fixed structure and said rotatable element, a seal sleeve carried by said rotatable element for rotation therewith, a seal housing disposed about and carried by said seal sleeve, means mounting said seal housing for rotation relative to said seal sleeve, said seal housing carrying an end face sealing surface, an end face seal carried by said seal sleeve for rotation therewith, said end face seal lying in engagement with said end face sealing surface whereby said housing and said end face seal normally rotate with said seal sleeve and said rotatable element, a housing fixed to said structure, an inflatable bladder carried by said fixed housing about said rotatable element and spaced from said seal housing, and means for inflating said bladder to engage said bladder against said seal housing and prevent rotation thereof with said end face seal and said seal sleeve, whereby said bladder and said seal housing form a static seal between said seal sleeve and said fixed housing and said end face seal and said sealing surface form a dynamic seal between said fixed housing and said seal sleeve.

11. Apparatus according to claim 10 wherein said bladder is annular in shape and spaced radially outwardly of said seal housing, said bladder being expandable in a radially inward direction to engage said seal housing.

12. Apparatus according to claim 10 wherein said mounting means includes a bearing between said seal housing and said seal sleeve.

13. Apparatus according to claim 10 wherein said end face seal is formed of a resilient material, a spring engagable about said end face seal for clamping said end face seal in frictional sealing engagement about said seal sleeve.

14. Apparatus according to claim 10 wherein said seal housing is annular and generally channel shaped in cross section, said end face sealing surface comprising an inside face of one of the flanges of said annular channel shaped housing, said end face seal lying within said channel shaped housing.

15. Apparatus according to claim 10 wherein said seal housing has a second end face sealing surface in axially spaced opposition to the first mentioned end face sealing surface, a second end face seal carried by said seal sleeve for rotation therewith, said second end face seal lying in engagement with said second end face sealing surface, said second end face seal and said second end face sealing surface providing a second dynamic seal between said fixed housing and said seal sleeve when said bladder is inflated to engage said housing and prevent it from rotating.

16. Apparatus according to claim 15 wherein said seal housing is annular and generally channel shaped in cross section, said end face sealing surfaces being formed along opposed inside faces of the spaced flanges of said annular channel shaped housing, said end face seals lying within said channel shaped housing.

17. Apparatus according to claim 10 wherein said bladder is annular in shape and spaced radially outwardly of said seal housing, said bladder being expandable in a radially inward direction to engage said seal housing, said mounting means including a bearing between said seal housing and said seal sleeve, said seal housing being annular and generally channel shaped in cross section, said end face sealing surface comprising an inside face of one of the flanges of said annular channel shaped housing, said end face seal lying within said channel shaped housing.

18. Apparatus according to claim 8 wherein said seal housing has a second end face sealing surface comprising the inside face of the other flange of said annular channel shaped housing and in axially spaced opposition to the first mentioned end face sealing surface, a second end face seal carried by the rotatable element for rotation therewith and lying within said channel shaped housing, said second end face seal lying in engagement with said second end face sealing surface, said second end face seal and said second end face sealing surface providing a second dynamic seal between said fixed housing and said seal sleeve when said bladder is inflated to engage said seal housing and prevent it from rotating.

19. Apparatus according to claim 10 wherein said seal housing and said fixed housing are formed of components split along a diameter whereby said components are readily assembled and disassembled about said rotatable element.

* * * * *